(12) United States Patent
Ashdown et al.

(10) Patent No.: US 11,087,038 B2
(45) Date of Patent: Aug. 10, 2021

(54) IMPORTANCE-DIRECTED GEOMETRIC SIMPLIFICATION SYSTEM AND METHOD

(71) Applicant: SUNTRACKER TECHNOLOGIES LTD., Victoria (CA)

(72) Inventors: Ian Edward Ashdown, West Vancouver (CA); Jasen Wright, Victoria (CA); Jack Thomas, Victoria (CA)

(*) Notice: Subject to any disclaimer, the term of this patent is extended or adjusted under 35 U.S.C. 154(b) by 0 days.

(21) Appl. No.: 16/866,103

(22) Filed: May 4, 2020

(65) Prior Publication Data

US 2020/0349301 A1 Nov. 5, 2020

Related U.S. Application Data

(60) Provisional application No. 62/842,529, filed on May 2, 2019.

(51) Int. Cl.

| G06F 30/13 | (2020.01) |
|---|---|
| G06F 17/11 | (2006.01) |
| G06F 30/27 | (2020.01) |
| G06F 111/18 | (2020.01) |
| G06T 15/55 | (2011.01) |
| G06T 3/40 | (2006.01) |

(52) U.S. Cl.
CPC .............. G06F 30/13 (2020.01); G06F 30/27 (2020.01); G06T 3/4046 (2013.01); G06T 15/55 (2013.01); *G06F 17/11* (2013.01); *G06F 2111/18* (2020.01); *G06T 2210/04* (2013.01)

(58) Field of Classification Search
CPC ......... G06F 30/13; G06F 30/27; G06F 17/11; G06F 2111/18; G06F 111/18; G06T 3/4046; G06T 15/55; G06T 2210/04; G06T 17/205; G06T 3/40; G06T 17/20
See application file for complete search history.

(56) References Cited

U.S. PATENT DOCUMENTS

| 8,666,320 B2 * | 3/2014 | Motoyoshi ............ H04W 16/18 455/67.11 |
|---|---|---|
| 10,380,293 B1 * | 8/2019 | Liu ........................ G06F 30/23 |
| 2018/0144545 A1 | 5/2018 | Legrand et al. |

FOREIGN PATENT DOCUMENTS

| CN | 101852525 B | 12/2011 | |
|---|---|---|---|
| WO | WO 00/21003 | * 10/1999 | ............. G06F 17/50 |

OTHER PUBLICATIONS

Ashdown, I. 1994. Radiosity: A Programmer's Perspective, pp. 284-285. New York, NY:John Wiley & Sons.
Rushmeier, H., et al. 1993. "Geometric Simplification for Indirect Illumination Calculations," Proc. Graphics Interface 93, pp. 227-236.

(Continued)

*Primary Examiner* — Vuthe Siek

(57) ABSTRACT

The present invention relates to the importance-directed geometric simplification of complex mesh-based representations of objects in virtual environments for radiosity-based global illumination simulations. By means of simplification, the time needed to solve the radiosity equation and so generate an accurate physically-based simulation can be markedly reduced. Further, geometric simplification is performed during the global illumination simulation process rather than as a preprocess step.

17 Claims, 8 Drawing Sheets

(56) References Cited

OTHER PUBLICATIONS

Garland, M., and P. S. Heckbert. (1997). "Surface Simplification Using Quadric Error Metrics," Proc. ACM SIGGRAPH '97, pp. 209-216.
Arvo, J., et al. 2015. 3D Mesh Simplification: A Survey of Algorithms and CAD Model Simplification Tests. Technology Center Research Report No. 3—Aug. 2015, University of Turku, Finland.
Pojar, E., and D. Schmalsteig. 2003. "User-Controlled Creation of Multiresolution Meshes," Proc. 2003 Symposium on Interactive 3D Graphics, pp. 127-130.
Christensen, P. H. 2003. "Adjoints and Importance in Rendering: An Overview," IEEE Transactions on Visualization and Graphics 9(3)1-12.
Smits et al. 1992. "An Importance-Driven Radiosity Algorithm," Computer Graphics 26(2):273-282.
Dutré, P., et al. 1997. "Bidirectional Radiosity," Proc. Eighth Eurographics Workshop on Rendering, pp. 75-84.
Bozalina, J. 2011. Perspective-Driven Radiosity on Graphics Hardware. MSc thesis, Texas A&M University.
George, D., et al. 2018 "3D Mesh Segmentation via Multi-Branch 1D Convolutional Neural Networks" Swansea University, United Kingdom.
Reich, A., et al. 2015. "Illumination-driven Mesh Reduction for Accelerating Light Transport Simulations," Computer Graphics Forum 34(4):165-174.
Yao, L., et al. 2015. "Quadratic Error Metric Mesh Simplification Algorithm Based on Discrete Curvature," Mathematical Problems in Engineering vol. 2015, Article 42817.
A'lvarez, R., et al. 2007 "A Mesh Optimization Algorithm Based on Neural Networks" Departemento de Ciencia de la Computacion e Inteligencia Artificial, Universidad de Alicante, E-03080 Alicante, Spain.
Connor, M., 2007 "A Simple, Thread-Safe, Approximate Nearest Neighbor Algorithm" The Florida State University.
Fritzke, B., 1995 "A Growing Neural Fas Network Learns Topologies" Institut fur Neuroinformatik Ruhr-Universitat Bochum D-44780, Bochum, Germany.
Fiser, D., et al. 2013 "Growing Neural Gas Efficiently" Department of Cybernetics, Faculty of Electrical Engineering, Czech Technical University in Prague, Technicka 2, Prague 6, Czech Republic 166 27.
Garland, M., and Heckbert, P., 1998 "Simplifying Surfaces with Color and Texture using Quadric Error Metrics" Carnegie Mellon University.

* cited by examiner

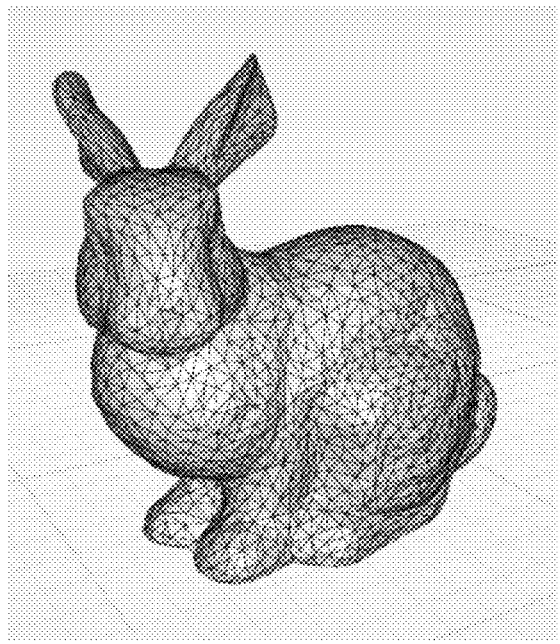
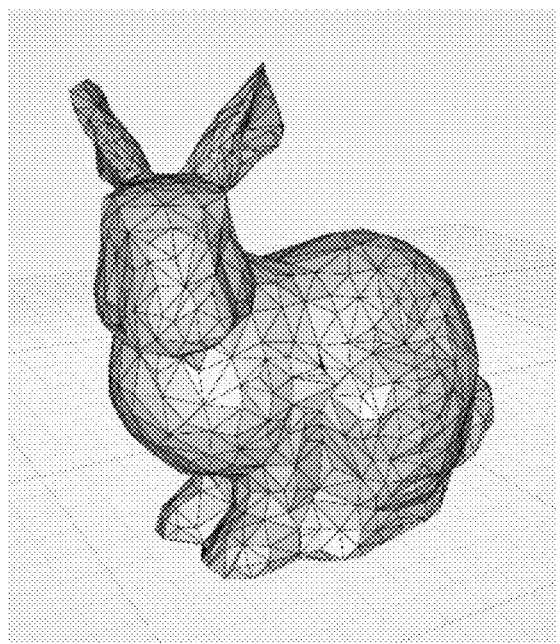
FIG. 1A
FIG. 1B
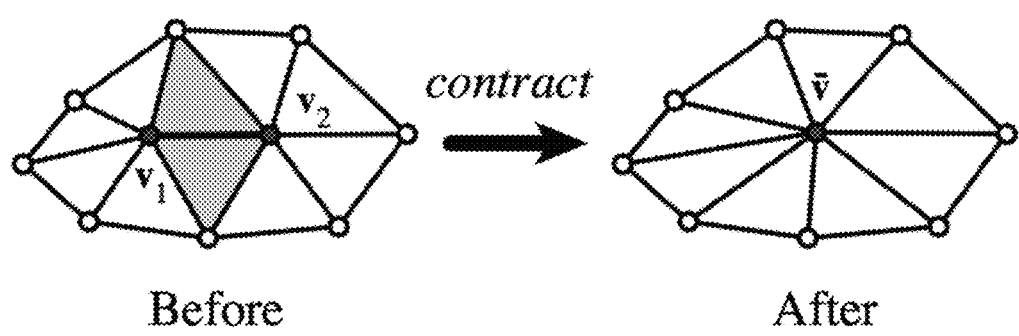
Before
After
FIG. 2

IMPORTANCE-DIRECTED GEOMETRIC SIMPLIFICATION SYSTEM AND METHOD

TECHNICAL FIELD

The present invention relates to the importance-directed geometric simplification of complex mesh-based representations of objects in virtual environments for radiosity-based global illumination simulations. By means of simplification, the time needed to solve the radiosity equation and so generate an accurate physically-based simulation can be markedly reduced. Further, geometric simplification is performed during the global illumination simulation process rather than as a preprocess step.

BACKGROUND

Lighting design and analysis relies on the ability to generate accurate, physically-based lighting simulations of virtual environments. Unlike architectural visualizations where the goal is to generate visually realistic imagery, these lighting simulations must properly account for the interreflection of light ("bounces") between multiple surfaces until most of the light emitted by the light fixtures ("luminaires") is absorbed.

There are two techniques for performing these simulations, referred to as "global illumination" algorithms: radiosity methods and ray tracing techniques (such as photon mapping). The advantage of radiosity methods is that their solutions are view-independent; that is, the virtual environment can be instantly viewed from any camera position once the radiosity solution has been obtained. Ray tracing techniques, on the other hand, are typically view-dependent, where a lighting solution must be calculated for each camera position. Once calculated, view-independent solutions enable lighting designers to generate orthographic projections for isolux plots, employ view planes to remove intervening geometry, and interactively tour the illuminated spaces in three dimensions; none of this is possible with view-dependent lighting solutions.

A disadvantage of the basic radiosity method is that it has in general quadratic time complexity, designated $O(n)^2$, where n is the number of triangular or quadrilateral elements that represent the mesh geometry of the virtual environment. A complex environment representing, for example, an industrial plant, may have hundreds of thousands to tens of millions of elements. Calculating a radiosity solution for such an environment may require hours of CPU time on a typical desktop computer.

It is possible to reduce this time complexity by subdividing flat surfaces into a two-level hierarchy of "patches" and elements, where each patch is comprised of multiple elements (e.g., Ashdown, I. 1994. Radiosity: A Programmer's Perspective, pp. 284-285. New York, N.Y.: John Wiley & Sons). With an environment comprised of n elements and m patches, the time complexity becomes in general $O(mn)$. If, for example, each patch is comprised of four elements, the time complexity is reduced by a constant factor of four. However, this approach only works for planar surfaces—the elements of a curved surface cannot be merged into a single patch, which must itself be planar.

An alternative approach that was first proposed in Rushmeier, H., et al. 1993. "Geometric Simplification for Indirect Illumination Calculations," Proc. Graphics Interface 93, pp. 227-236, is to simplify the mesh geometry of complex objects in the virtual environment. For example, FIG. 1 shows a single object comprised of 4,968 triangular elements that has been reduced to 1,495 elements using the geometric simplification algorithm presented in Garland, M., and P. S. Heckbert. (1997). "Surface Simplification Using Quadric Error Metrics," Proc. ACM SIGGRAPH '97, pp. 209-216.

Geometric simplification is a well-studied field of computer graphics with many different algorithms described in dozens of research papers (e.g., Arvo, J., et al. 2015. 3D Mesh Simplification: A Survey of Algorithms and CAD Model Simplification Tests. Technology Center Research Report No. 3—August 2015, University of Turku, Finland). Most of these algorithms, unfortunately, focus on the global simplification of single objects. This is useful, for example, for computer games development, where highly detailed animated characters are represented as a hierarchy of progressively simplified meshes. This multiresolution approach is employed such that the mesh used to display the character depends on how close the character is to the camera. The more distant the character, the less detail is required and so a more simplified mesh can be used.

With these algorithms, a user-specified global parameter limits simplification to a certain fraction of the original number of mesh elements. In particular, a "contraction cost" parameter can be applied to each mesh edge that determines whether an edge defined by two vertices is to be "contracted" into a single vertex, thereby removing the edge (FIG. 3). Global simplification proceeds by iteratively choosing the edge with the lowest contraction cost and removing it (e.g., Garland and Heckbert 1997).

However, it is possible to specify contraction cost parameters on a per vertex basis. As shown for example by Pojar, E., and D. Schmalsteig. 2003. "User-Controlled Creation of Multiresolution Meshes," Proc. 2003 Symposium on Interactive 3D Graphics, pp. 127-130, regions of a mesh-based object can be identified by the user as being "important" and so the edges within the region assigned higher contraction costs and thereby protected from mesh simplification.

This per-object approach often fails, however, for complex environments. As an example, FIG. 3A shows a small portion of an industrial plant where it is difficult to determine which surfaces belong to specific objects. The mesh geometry was likely created by industrial engineers, whose interests were in the functional requirements of the industrial plant hardware and not the needs of lighting design and analysis. Consequently, the lighting designer would need to manually identify which regions of the complex geometry, likely encompassing portions of many different objects, are important in terms of lighting design and analysis.

FIG. 3B shows a visual rendering of the mesh geometry of FIG. 3A, based on the radiosity solution for the environment. Luminaires illuminate a small region of the walkway and the large tank, with most of the geometry receiving little if any illumination. For lighting design purposes, only the illuminated surfaces are usually considered important; other surfaces can be aggressively simplified.

There are however no known methods whereby these illuminated surfaces can be unambiguously identified without first calculating a radiosity solution for the environment. The present invention addresses this problem using the concept of "importance" from neutron transport theory.

SUMMARY

The invention deals with the modern architectural/engineering CAD drawing where there are millions of polygons (they tend to be multipurpose, and include every nut and bolt for every use), yet it is not necessary for lighting design (or potentially other design applications which can employ radiosity) to maintain all these polygons, yet we need sufficient complexity in certain areas of the CAD model (in this case, based on modelling of light to determine what is important and what is not). Because process time to render and successfully model the light for millions of polygons would grind all software to a halt, and can grind the model loading time to a halt too, the normal approach is to either simplify everything, or employ massive computing power. We recognize that employing the techniques of targeting areas to simplify, we can significantly reduce the number of polygons in the diagram, yet maintain the complexity of regions that are of interest.

Ultimately, we are looking at an efficient means by which we can simplify parts of a CAD drawing by determining what is important, based on following the light and importance from cameras and luminaires, and using the first couple of radiosity bounces to define the important areas and simplify the remainder. Because there are usually a number of luminaires, this is an iterative process that involves determining overlapping areas and so forth. This iterative process makes it an excellent candidate for certain AI/neural network algorithms.

Geometric simplification may still be applied to the entire CAD model, with different levels of simplification based on importance. As indicated before, some of these models have millions of polygons, and include every nut and bolt. Reducing the complexity of a model by as little as one to ten percent for areas of importance can remove unimportant features, while maintaining sufficient complexity to make the rendering of important areas still of value.

Also, simplification is not a dichotomy, and importance can be ranked on a gradient, with different levels of importance and subsequently different levels of simplification. In addition, these levels of simplification may be set by the user, or automated.

The present invention uses virtual camera/luminaire locations to identify and rank the importance of different aspects of a CAD architectural drawing, and simplifies areas based on this importance, with the degree of simplification required or the degree of complexity required determined by the user or through machine learning.

To this end, simplification may be a preprocess step, a parallel process step, or a post process step. The application of machine learning will additionally improve performance for determining regions of importance, and the degree to which simplification is applied to different parts of the CAD drawing.

The present invention involves identifying areas of a mesh and simplifying the remainder of the mesh. In addition, we are applying machine learning to the process, and allowing variable levels of simplification for different areas.

BRIEF DESCRIPTION OF DRAWINGS

FIG. 1A shows a single object before geometric simplification.

FIG. 1B shows a single object after geometric simplification.

FIG. 2 shows a mesh edge connecting two vertices that is collapsed to form a single vertex and the two adjoining elements consequently deleted.

DETAILED DESCRIPTION

Figure 3A:
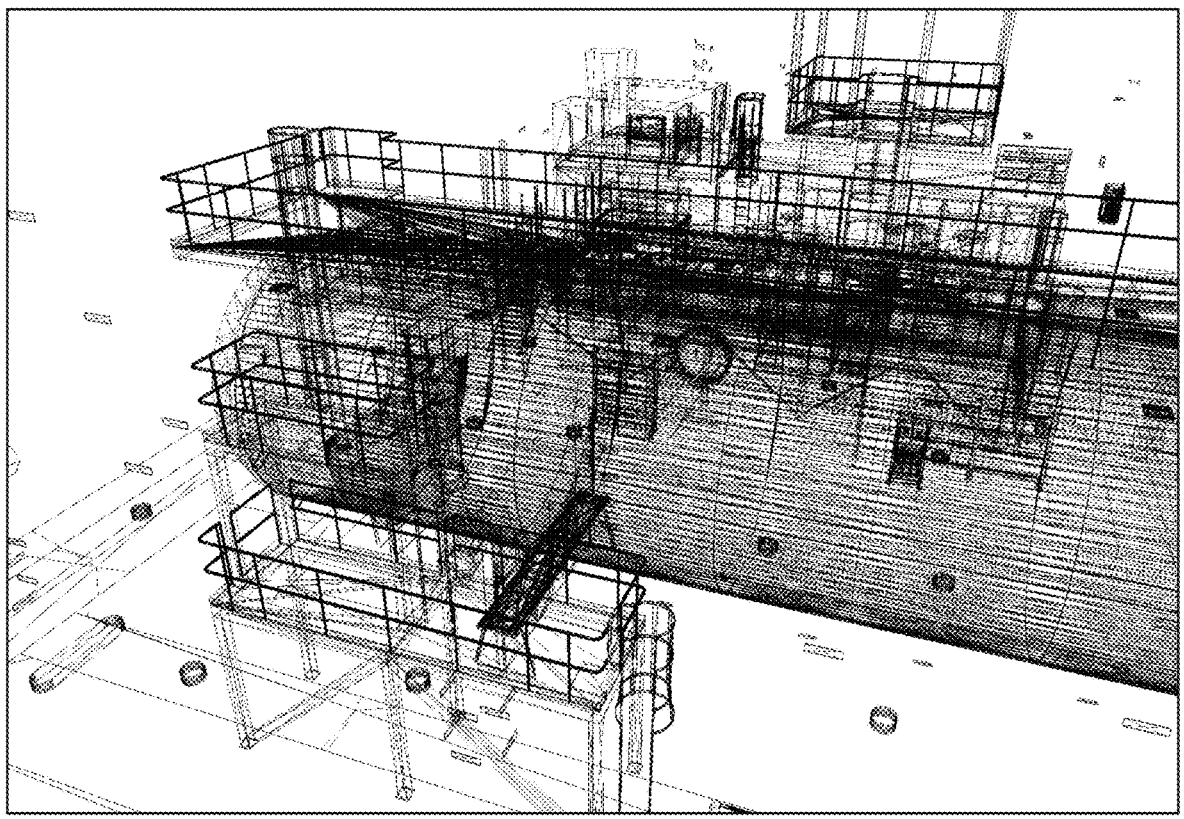
FIG. 3A shows the mesh geometry of a portion of a large industrial plant.

In this disclosure, the following terms have the following meaning:

Optical radiation includes electromagnetic radiation with wavelengths between 100 nm and 1 mm.

Light means visible optical radiation with wavelengths between approximately 400 nm and 700 nm.

Flux means electromagnetic radiation power, which when spectrally weighted may be expressed as radiant flux (watts), luminous flux (lumens), or photon flux (micromoles per second).

Exitance means flux emitted by a surface per unit area.

Interreflection means optical radiation reflected by a first surface and received by a second surface.

Luminaire means an electric light fixture comprised of one or more lamps or other light sources with all necessary parts and wiring.

Global illumination means a group of algorithms used in three-dimensional computer graphics that take into account both direct optical radiation emitted by light sources and indirect optical radiation transferred between surfaces by reflection or transmission.

Form factor is a unitless geometric parameter representing the proportion of flux diffusely emitted by a first surface that is received by a second surface.

Mesh is a set of vertices in three-dimensional space that are connected by edges, and wherein the edges of three or more coplanar vertices may represent a face.

Mesh geometry means one or more meshes that define the geometry of a three-dimensional object.

Edge contraction is a mathematical operation which removes an edge from a mesh while simultaneously merging the two vertices that it previously joined.

Contraction cost is a metric that represents the computational cost of contracting an edge.

Geometric simplification is the process of simplifying the mesh geometry of an object, for example by means of edge contraction.

Radiosity is a global illumination algorithm that models the interreflection of optical radiation between surfaces in a virtual environment using radiative flux transfer theory.

Radiosity solution is the result of calculating the distribution of optical radiation within a virtual environment using a radiosity algorithm.

Progressive refinement radiosity means an interactive radiosity algorithm wherein the form factors between surfaces are calculated on demand as the iterative algorithm progresses.

Ray tracing is a global illumination algorithm that models the interreflection of optical radiation between surfaces in a virtual environment using rays that trace the paths of photons.

Photon mapping is a two-pass global illumination algorithm, the first pass employing ray tracing to calculate the distribution of optical radiation at points on surfaces within a virtual environment, followed by a second pass wherein an image of the environment is generated by interpolating between said surface points to determine image pixel intensities.

Importance is the mathematical dual (adjoint) of ray tracing, wherein importons are traced from the observer to surfaces and therein reflected or transmitted until they eventually terminate at a light source.

Importons are the mathematical dual of photons.

View-dependent means a global illumination algorithm, such as for example photon mapping, where the solution assumes an observer position and view direction within the virtual environment.

View-independent means a global illumination algorithm, such as for example progressive radiosity, where the solution is independent of any observer position or view direction.

Within this disclosure, reference to computer includes a device a programmable electronic device designed to accept data, perform prescribed mathematical and logical operations at high speed, and display the results of these operations, and may include for example mainframes, desktop and laptop computers, tablets, and smartphones. Software refers to any programs and other operating information used by a computer. An algorithm, as described herein, is a process or set of rules to be followed by software and used by a computer.

The concept of "importance" was first introduced as a mathematical formalism in neutron transport theory in the 1950s and later adapted for computer graphics use (e.g., Christensen, P. H. 2003. "Adjoints and Importance in Rendering: An Overview," IEEE Transactions on Visualization and Graphics 9(3):1-12). As explained in Smits et al. 1992. "An Importance-Driven Radiosity Algorithm," Computer Graphics 26(2):273-282, importance is the dual of radiosity. With radiosity, photons emitted by virtual light sources are tracked through the environment as they are reflected from surfaces until they are ultimately absorbed. With importance, "importons" emitted by a virtual camera are similarly tracked through the environment as they are reflected from surfaces until they are ultimately absorbed. (With neutron transport, importons are emitted by a neutron detector.)

Figure 4:
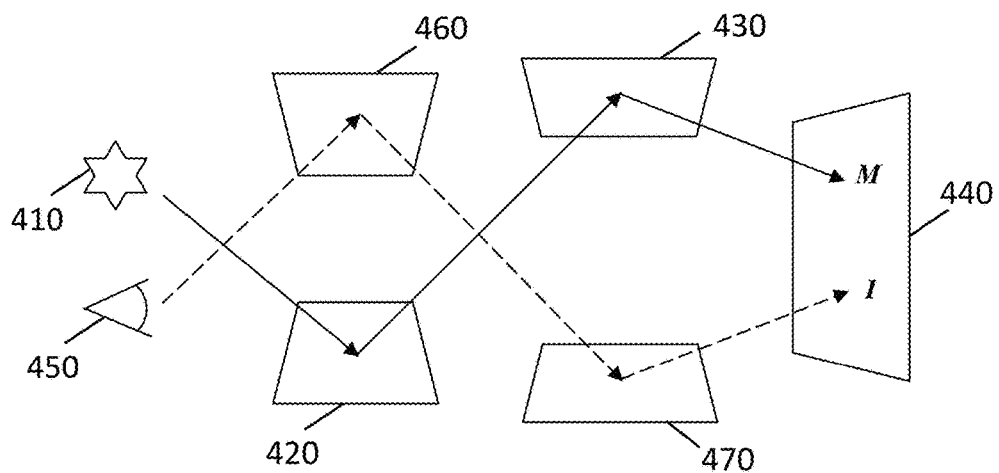
FIG. 4 shows the duality of exitance M and importance I.

It should be noted that radiosity methods track the flow of exitance (measured in watts, candela, or micromoles per second, per unit area) rather than photons between surfaces in the environment, as explained in for example Ashdown 1994, pp. 46-47. Importons are dimensionless, but importance is conceptually similar to exitance in that it is measured per unit area. This is shown in FIG. 4, where a photon is emitted by light source 410 and reflected by surfaces 420 and 430 before being incident upon and contributing to the exitance M of surface 440. Similarly, an importon is emitted by camera (or more generally an observer) 450 and is reflected by surfaces 460 and 470 before being incident upon and contributing to the importance I of surface 440.

Figure 5A:
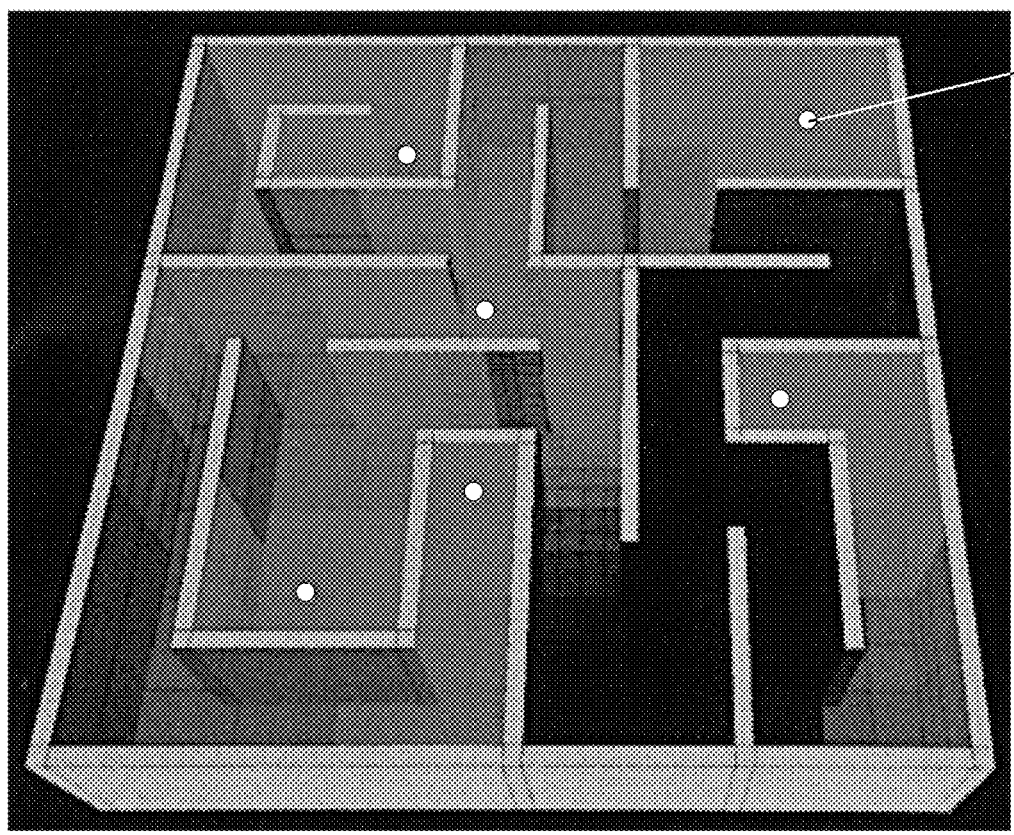
FIG. 5A shows a labyrinth with its surfaces illuminated by six light sources.

Smits et al. (1992) employ importance as a means of identifying which surfaces in an environment are important to a virtual camera in the environment. Referring to FIG. 5A, six light sources (shown as small white circles 500) emit photons that are diffusely reflected from the floor and walls of a labyrinth, with the image showing the resultant distribution of exitance across the surfaces. In accordance with the finite-element radiosity method, these surfaces are recursively subdivided into rectangular elements in order to more accurately represent changes in exitance across the surfaces (e.g., Ashdown 1994, pp. 439-440).

Figure 5B:
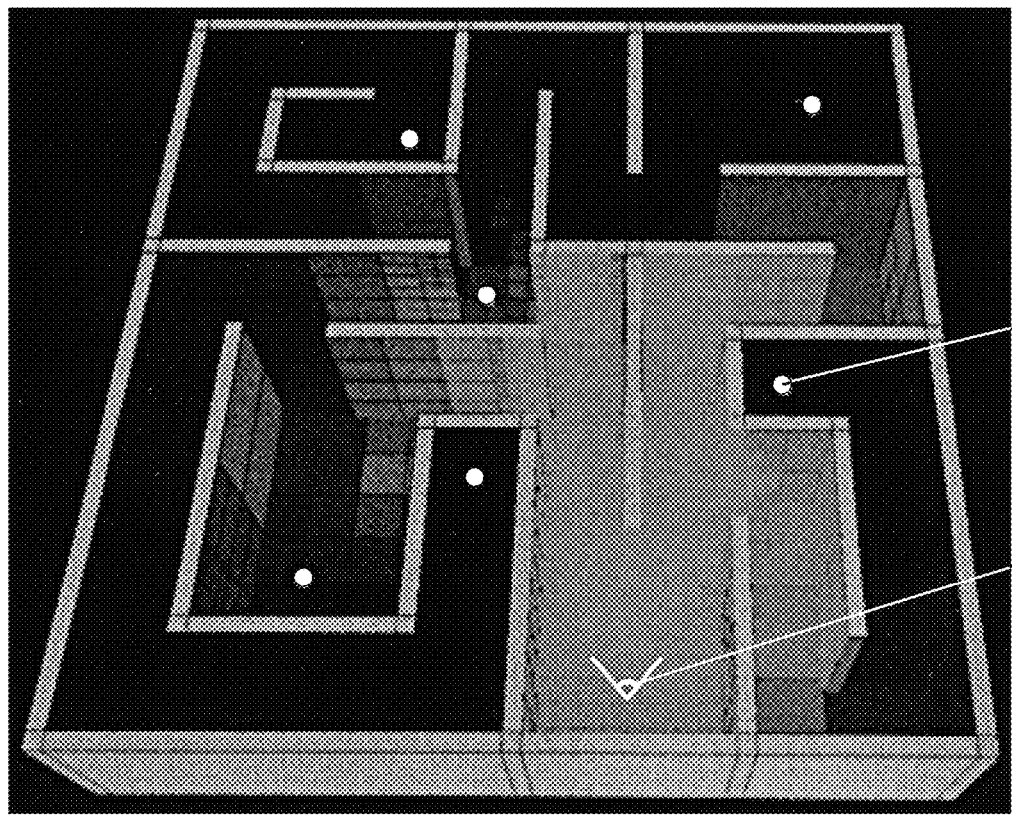
FIG. 5B shows a labyrinth with a virtual camera and the importance distribution of the surrounding surfaces.

Referring to FIG. 5B, a virtual camera (represented by a protractor symbol 510) emits importons that are also diffusely reflected from the floor and walls of the labyrinth, with the image showing the resultant distribution of importance across the surfaces. Again, in accordance with the finite-element radiosity method, these surfaces are recursively subdivided into rectangular elements in order to more accurately represent changes in importance across the surfaces.

Figure 6:
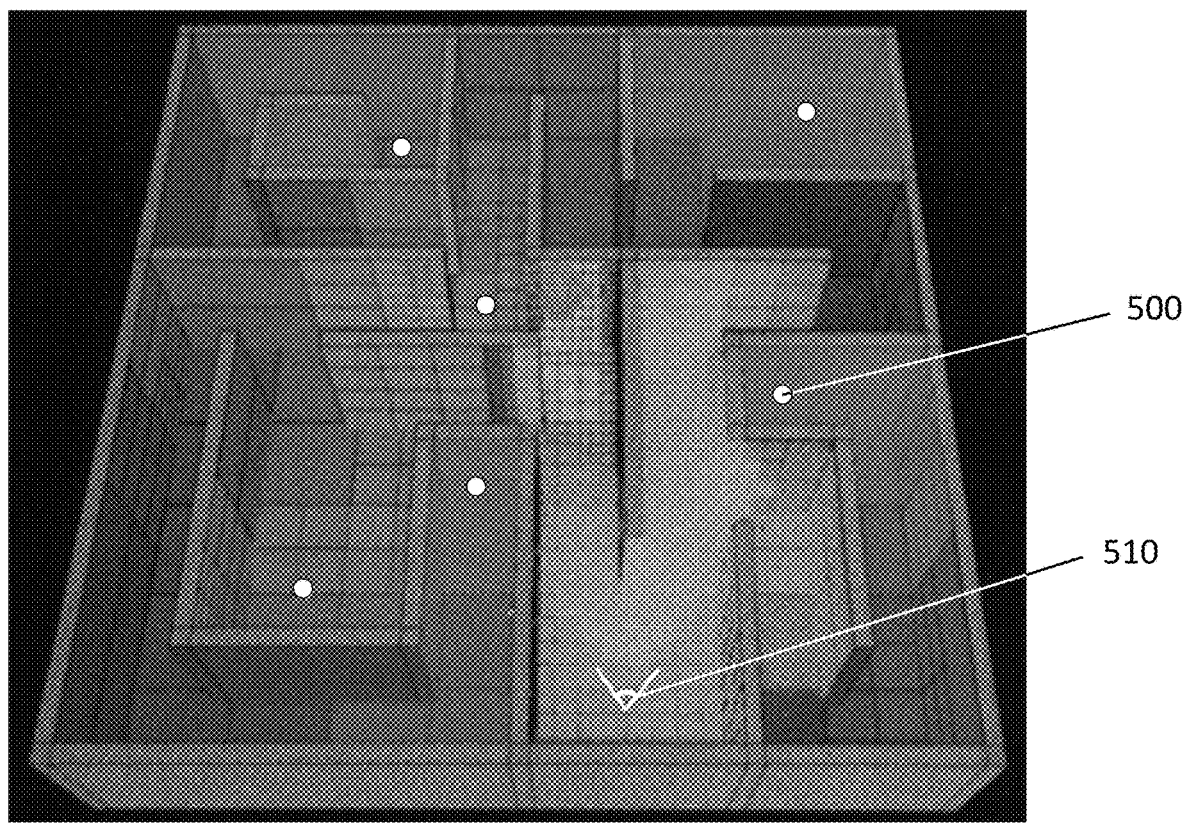
FIG. 6 shows a labyrinth with the exitance and importance distributions of its surfaces combined.

FIG. 6 shows the same labyrinth with the distributions of both exitance and importance combined, along with subdivision of wall and floor surfaces into element meshes. The shading of the distributions is arbitrary, as photons have energy while importons are dimensionless. More usefully, the combination of exitance and importance results in surface meshes that accurately represent the spatial distribution of exitance as seen by the virtual camera. These meshes minimize the number of elements that must be considered by the radiosity method.

The disadvantage of the importance-driven radiosity method as described by Smits et al. (1992) is that it is view-dependent, which negates one of the primary advantages of radiosity methods for lighting design and analysis. The authors did note that the importance of multiple virtual cameras could be calculated, but this would still require the manual determination of the virtual camera positions and orientations.

Exitance and Importance Duality

It is useful to consider environments where all surfaces diffusely reflect or transmit light. This is a requirement for most radiosity methods, where the spatial distribution of exitance M over N surface elements in an environment can be described as:

$$M_i = M_{0i} + \rho_i \Sigma_{j=1}^{N} F_{ij} M_j, i=1, \ldots, N \quad (1)$$

where $M_i$ is the exitance of the $i^{th}$ surface element, $M_{0i}$ is its initial exitance and $\rho_i$ is its reflectance, while $M_j$ is the exitance of the $j^{th}$ surface element, and $F_{ij}$ is the form factor between the $i^{th}$ and $j^{th}$ element (e.g., Ashdown 1994, pp. 40-41).

In matrix form, this equation becomes:

$$\begin{bmatrix} 1-\rho_1 F_{11} & \cdots & -\rho_1 F_{1N} \\ \vdots & \vdots & \vdots \\ -\rho_N F_{NN} & \cdots & 1-\rho_N F_{NN} \end{bmatrix} \begin{bmatrix} M_1 \\ \vdots \\ M_N \end{bmatrix} = \begin{bmatrix} M_{01} \\ \vdots \\ M_{0N} \end{bmatrix} \quad (2)$$

as discussed in, for example, Ashdown, I. (1994), pp. 46-47.

As explained in Ashdown (1994), p. 380, this is an iterative equation, where each iteration represents the $i^{th}$ surface element "gathering" exitance from all of the other surface elements. This equation can be solved for the exitance vector $[M_1 \ldots M_N]^T$ using Jacobi iteration (e.g., Ashdown 1994, pp. 379-380), where Equation 1 becomes:

$$M_i^{(k)} = M_{0i} + \rho_i \Sigma_{j=1}^{N} F_{ij} M_j^{(k-1)}, i=1, \ldots, N \quad (3)$$

for the $k^{th}$ iteration.

As noted by Smits et al. (1992), importance is the dual, or adjoint, of exitance (e.g., Christensen 2003). In particular, the spatial distribution of importance I over N surface elements in an environment can be described as:

$$I_i = I_{0i} + \rho_i \Sigma_{j=1}^{N} I_j F_{ij}, i=1, \ldots, N \quad (4)$$

where $I_i$ is the importance of the $i^{th}$ surface element, $I_{0i}$ is its initial importance and $\rho_i$ is its reflectance, while $I_j$ is the importance of the $j^{th}$ surface element, and $F_{ij}$ is the form factor between the $i^{th}$ and $j^{th}$ element.

In matrix form, this equation similarly becomes:

$$\begin{bmatrix} 1-\rho_1 F_{11} & \cdots & -\rho_1 F_{1N} \\ \vdots & \vdots & \vdots \\ -\rho_N F_{N1} & \cdots & 1-\rho_N F_{NN} \end{bmatrix} \begin{bmatrix} I_1 \\ \vdots \\ I_N \end{bmatrix} = \begin{bmatrix} I_{01} \\ \vdots \\ I_{0N} \end{bmatrix} \quad (5)$$

The application of importance to radiosity methods is discussed in Smits et al. (1992), Dutré, P., et al. 1997. "Bidirectional Radiosity," Proc. Eighth Eurographics Workshop on Rendering, pp. 75-84, Bozalina, J. 2011. Perspective-Driven Radiosity on Graphics Hardware. MSc thesis, Texas A&M University, and Reich, A., et al. 2015. "Illumination-driven Mesh Reduction for Accelerating Light Transport Simulations," Computer Graphics Forum 34(4): 165-174, where it is used to identify surface elements that are important to the rendering process from the perspective of a virtual camera. Consequently, as previously noted, importance results in view-dependent radiosity methods.

What is not evident from this literature or any other prior art is that a virtual camera can be positioned at each luminaire. Further, the angular distribution of importons emitted by the camera can be the same as the luminous (or radiant) intensity distribution of the associated luminaire. With this, the importons intersect exactly the same surface elements as the photons emitted by the luminaire, and so the spatial distribution of exitance and importance are identical. This uniquely results in a view-independent radiosity method that incorporates importance.

Incorporating Importance

While geometric simplification algorithms can be applied to either single or the entire environment geometry, they are invariably applied separately as a preprocess step prior to lighting simulation using radiosity methods or ray-tracing techniques. For example, Reich, A., et al. 2015. "Illumination-driven Mesh Reduction for Accelerating Light Transport Simulations," Computer Graphics Forum 34(4):165-174, trace importons from user-specified camera positions using photon mapping techniques, then use the resultant importance distribution to perform geometric simplification of objects in the environments before performing photon mapping to generate visual images.

Given however that the radiosity equation (2) and importance equation (5) are identical modulo the exitance and importance terms, iteratively solving the radiosity equation using Southwell iteration or a similar method also solves the importance equation if importance is determined wherein the cameras are coincident with the luminaires and share the same angular distribution for directly emitted photons and importons. That is, the importance value for each element is simply a scaled version of the exitance value.

Referring to Equation 1, each luminaire emits luminous flux that illuminates the set of N surface elements (although an element may be partially or wholly occluded by other elements). This flux provides the initial exitance $M_{0i}$ according to the following algorithm:

```
M_0 = 0.0
FOR each luminaire
    FOR each element i
        Calculate element initial exitance M_0i
        M_0 = M_0 + M_0i
    ENDFOR
ENDFOR
``` which also calculates the total initial exitance $M_0$ emitted by the luminaires and received by all the surface elements.

Having calculated the initial surface exitances $M_{0i}$, Equation 3 can be solved using Jacobi or Gauss-Seidel iteration (e.g. Ashdown 1994, pp. 379-381). However, a computationally more efficient algorithm is Southwell iteration, which is described in Ashdown 1994, pp. 382-386, wherein each element has an initial "unsent exitance" value $\Delta M_i^{unsent}$.

When an element i receives exitance either directly from the luminaires or indirectly from light diffusely reflected from other elements, it will absorb a portion $\rho_i$ and diffusely reflect the rest. The absorbed portion is $M_i^{(k)}$, while the diffusely reflected portion $\Delta M_i^{unsent}$ is subsequently "shot" back into the environment. After this occurs, the value $\Delta M_i^{unsent}$ s reset to zero.

Initially, $\Delta M_i^{unsent}$ is equal to the initial surface exitance $M_{0i}$. The total amount of light distributed among the surface elements is therefore $\Sigma_{i=1}^{N} \Delta M_i^{unsent} A_i$, where $A_i$ is the element area.

As the light bounces from element to element with each iteration, the total amount will progressively decrease until there is some predetermined fraction $\varepsilon_{exit}$ of the original amount (which is typically 0.01 to 0.05 for lighting design and analysis purposes). At this point, the radiosity algorithm is considered to have converged to a solution, where convergence is defined as:

$$conv = \frac{\Sigma_{i=1}^{N} M_i^{unsent}}{\Sigma_{i=1}^{N} M_{0i}} \quad (6)$$

With this, the progressive refinement radiosity algorithm is (Ashdown 1994, pp. 385):

```
FOR each element i
    M_i = ΔM_i^unsent = M_0i
ENDFOR
conv = 1
WHILE conv > ε_exit
    Select element i with greatest M_i^unsent A_i
    FOR each element j
        Calculate form factor F_ij
```

$$\Delta M = \rho_i F_{ij} M_i^{unsent} \frac{A_i}{A_j}$$

```
        ΔM_j^unsent = ΔM_j^unsent + ΔM
        M_j = M_j + ΔM
    ENDFOR
    Calculate convergence conv
    ΔM_i^unsent = 0
END WHILE
```

If the total amount of initial importance distributed among the surface elements is defined as unity, an importance threshold $\varepsilon_{import}$ can be similarly defined to the exitance threshold $\varepsilon_{exit}$. The initial importance $I_{0i}$ for each element i is thus calculated by:

```
I_0 = 0.0
FOR each luminaire
    FOR each element i
        I_0i = M_0i / M_0
    ENDFOR
ENDFOR
``` and importance can then be calculated in parallel with exitance in the progressive refinement radiosity algorithm as follows (with additions indicated by "←"):

```
import flag = FALSE                                    ←
FOR each element i
    M_i = ΔM_i^unsent = M_0i
    I_i = I_0i                                         ←
ENDFOR
conv = 1
WHILE conv > ε_exit
    Select element i with greatest M_i^unsent A_i
    FOR each element j ≠ i
        Calculate form factor F_ij ΔM = ρ_i F_ij M_i^unsent A_i/A_j ΔM_j^unsent = ΔM_j^unsent + ΔM
        M_j = M_j + ΔM
        I_j = I_j + ΔM/Σ_{i=1}^N M_0i                  ←
    ENDFOR
    Calculate convergence conv
    IF import_flag == FALSE                            ←
        IF conv < ε_import                             ←
            FOR each object                            ←
                Perform geometric simplification       ←
            ENDFOR                                     ←
            import flag = TRUE                         ←
        ENDIF                                          ←
    ENDIF                                              ←
    ΔM_i^unsent = 0
END WHILE
``` where the importance threshold $\varepsilon_{import}$ is greater than the exitance threshold $\varepsilon_{exit}$. In practice, an importance threshold of 0.2 to 0.5 is often sufficient for the purposes of identifying objects for geometric simplification.

Figure 7:
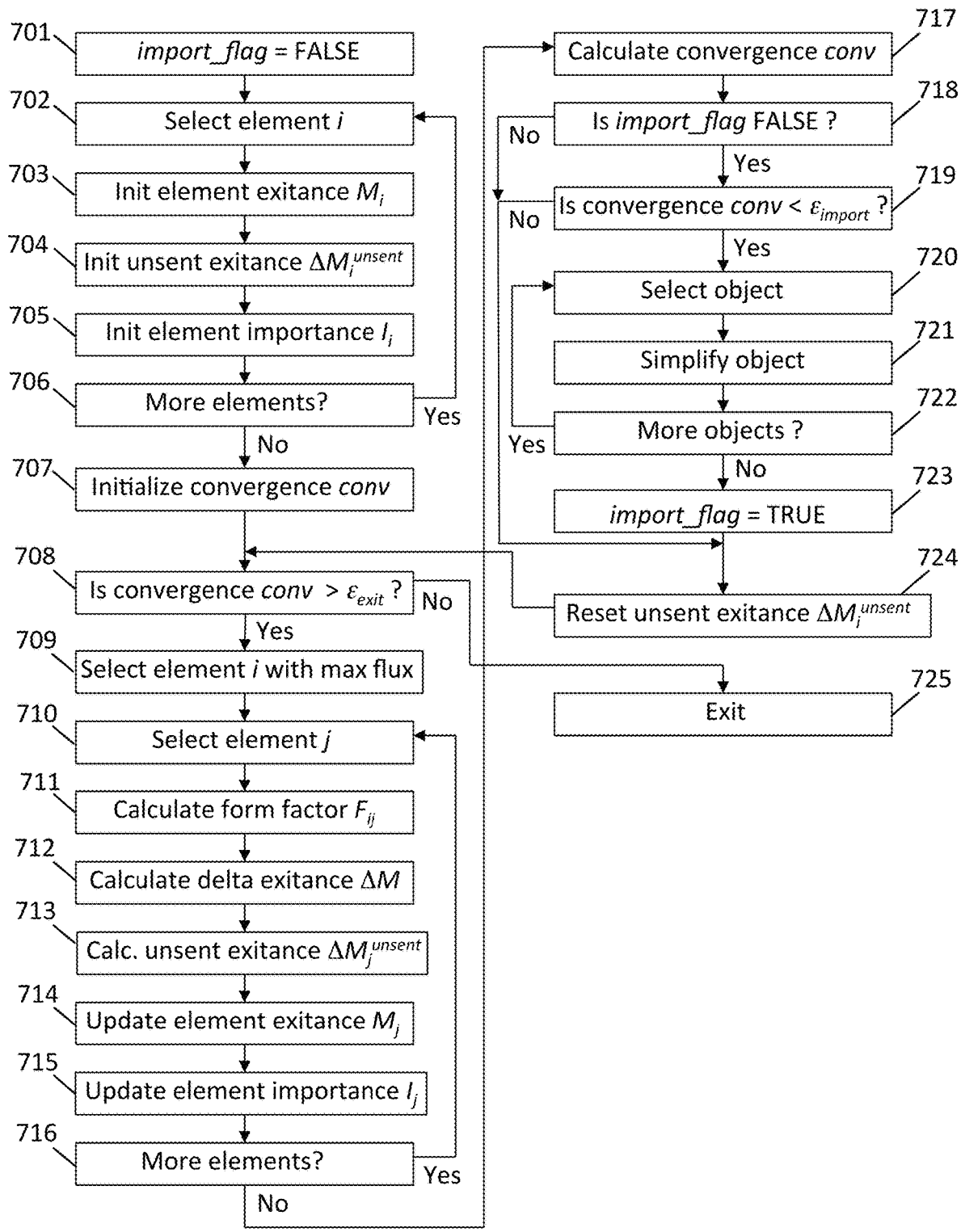
FIG. 7 shows the steps and decision tree for importance directed geometric simplification.

Referring to FIG. 7, this extended radiosity algorithm begins with Step 701, wherein the parameter import_flag is set to FALSE. In Step 702, an element i from the set of N elements is selected. The element exitance $M_i$ is initialized to $M_{0i}$ in Step 703, its unsent exitance $\Delta M_i^{unsent}$ is initialized to $M_{0i}$ in Step 704, and its importance $I_i$ is initialized to $I_{0i}$ in Step 705. In Step 706, if there are more elements in the set, control returns to Step 702; otherwise, control proceeds to Step 707, where the convergence parameter cony is initialized to unity.

In Step 708, convergence cony is compared to the exitance threshold $\varepsilon_{exit}$. If cony is greater than the exitance threshold, control proceeds to Step 709; otherwise the radiosity solution has converged and control proceeds to Step 725, where the algorithm exits.

In Step 709, the element i with the greatest amount of unsent luminous flux (defined as $M_i^{unsent} A_i$) is selected, from which its unsent exitance $M_i^{unsent}$ is to be emitted (or "shot") to the other elements in the environment.

In Step 710, an element j from the set of N−1 elements is selected, where i≠j. The form factor $F_{ij}$ is then calculated in Step 711, the delta exitance ΔM is calculated in Step 712, and the unsent exitance $M_j^{unsent}$ is calculated in Step 713. In Step 714, the element exitance $M_j$ is updated with the addition of delta exitance ΔM and in Step 715, the element importance $I_j$ is updated with the addition of $\Delta M/\Sigma_{i=1}^N M_{0i}$, which is the delta exitance ΔM divided by the initial exitance of all elements.

In Step 716, if there are more objects in the set, control returns to Step 710; otherwise, control proceeds to Step 717, where the convergence parameter cony is calculated in accordance with Equation 6.

In Step 718, if the import_flag parameter is FALSE, control proceeds to Step 719; otherwise control proceeds to Step 724.

In Step 719, the convergence parameter cony is compared to the importance threshold $\varepsilon_{import}$, where $\varepsilon_{import} > \varepsilon_{exit}$. If cony is less than the importance threshold, control proceeds to Step 720; otherwise the importance solution has converged and control proceeds to Step 724.

In Step 720, an object from the set of objects in the environment is selected, and in Step 721, geometric simplification is performed on the object mesh in accordance with the importance distribution (described in detail below).

In Step 722, if there are more objects in the set, control returns to Step 720; otherwise, control proceeds to Step 723, where the import_flag parameter is set to TRUE to indicate that the importance solution has converged. Therefore, in this exemplary embodiment of the invention, when the convergence value cony becomes less than the importance threshold $\varepsilon_{import}$, the geometric simplification is performed once.

In Step 724, the unsent exitance $M_i^{unsent}$ is reset, indicating that element i has "shot" its unsent exitance into the environment. Control then proceeds to Step 708, where the process continues until the radiosity solution converges and the algorithm exits in Step 725.

Optical radiation is part of the electromagnetic spectrum which may be subdivided into ultraviolet radiation (UV), the spectrum of light visible for man (VIS) and infrared radiation (IR), and typically ranges between wavelengths of 100 nm to 1 mm. While the examples for determining importance given above are based on luminous flux from the luminaire, importance can be derived from any aspect of optical radiation that can be expressed mathematically. Examples include, but are not limited to, photosynthetically available radiation (PAR), photosynthetic photon flux density (PPFD), and spectral power distribution (SPD).

Geometric Simplification

The extended radiosity algorithm calculates both importance and exitance on a per-element basis. However, geometric simplification of an object mesh requires an importance value to assigned to each vertex. This can be done by interpolating a vertex importance value as the average of the importance values of the elements sharing the vertex, similar to how vertex colors are interpolated (e.g., Ashdown 1994, pp. 206-209):

```
FOR each vertex i
    vert import = 0
    FOR each element sharing vertex i
        vert_import = vert_import + elem_import / num_elem
    ENDFOR
    Assign vert_import to vertex attributes
ENDFOR
```

Given an object mesh, Garland and Heckbert (1997) compute a quadric error metric Q (a 4×4 matrix) for each vertex and then calculate the contraction cost for each pair of vertices representing an edge. This was further extended by Garland, M., and P. S. Heckbert. 1998. "Simplifying Surfaces with Color and Texture Using Quadric Error Metrics," Proc. Visualization '98, pp. 263-269 to support contraction costs based on any real-valued vertex attributes. This generalized quadric error metric can include vertex importance.

Other extensions to the metric include Yao, L., et al. 2015. "Quadratic Error Metric Mesh Simplification Algorithm Based on Discrete Curvature," Mathematical Problems in Engineering Vol. 2015, Article 42817, which can also be extended to support vertex importance as per Graland and Heckbert (1998).

Figure 3B:
FIG. 3B shows a visual rendering of the mesh geometry based on the radiosity solution for the environment.

As shown for example in FIGS. 3A and 3B, some object meshes may receive an insignificant amount or even no light from the luminaires. Rather than performing edge contractions to remove elements, the objects may be marked such that they are not simply considered by the extended progressive refinement radiosity algorithm following the geometric simplification iteration.

In FIG. 3B, for example, the platform is illuminated by multiple luminaires. The designer may need to provide illumination for specific work tasks, but also ensure that there is sufficient illumination for emergency egress if the task illumination is disabled.

Importance can be incorporated into the geometric simplification algorithm presented in Garland and Heckbert (1997, 1998), but there are alternative algorithms such as those surveyed by Arvo et al. (2015). Importance can be incorporated into any of these algorithms as long as they support error metrics on a per-vertex or per-element basis.

Figure 8:
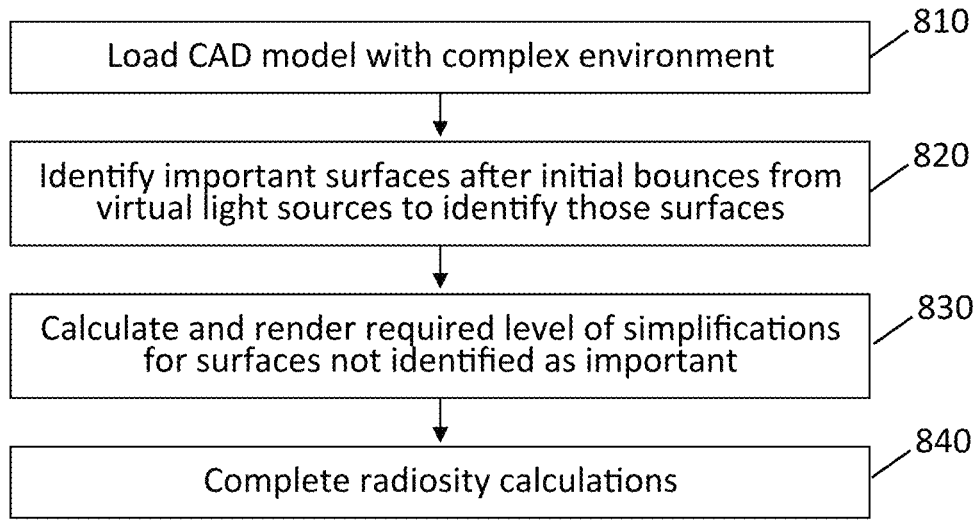
FIG. 8 shows an embodiment for simplification after importance determination

The actual simplification of the CAD model with the complex environment can occur at different stages of the entire calculation process. In one embodiment shown in FIG. 8 the CAD model that includes the complex environment subject to simplification is uploaded (810) into the computer. The important surfaces may be identified (820), for example as set out in FIG. 7. Each surface may be given an importance value on a scale of zero to one, or marked as having an importance above a predetermined importance limit $I_{L1}$. Once the importance surfaces are identified (e.g. they have an importance above $I_{L1}$) the areas not identified as important can be simplified (830), and the radiosity calculations completed (840).

Figure 9:
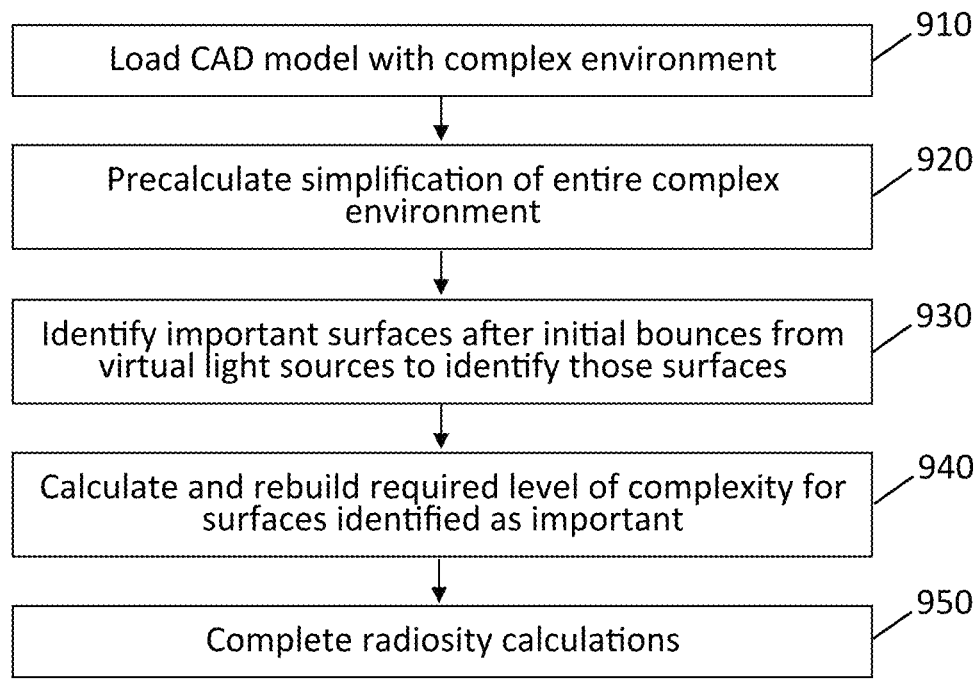
FIG. 9 shows an embodiment for simplification before importance determination

In a different embodiment shown in FIG. 9 the CAD model that includes the complex environment subject to simplification is uploaded (910) into the computer. As a precalculation step (920) the entire complex environment may be simplified. This precalculation step (920) does not, however, represent the final simplified geometric structure. The important surfaces may be identified (930), for example as set out in FIG. 7. Once these surfaces are identified the areas identified as important can be rebuilt to a higher level of complexity (940), which represents the final simplification of the complex environment. After this, the radiosity calculations are completed (950).

It should be noted that as simplification of complexity is scalable it is possible in either of the above embodiments to simplify or rebuild the complexity to a level that is usable for the calculations, but significantly less than the original complexity in the CAD model provided.

Figure 10:
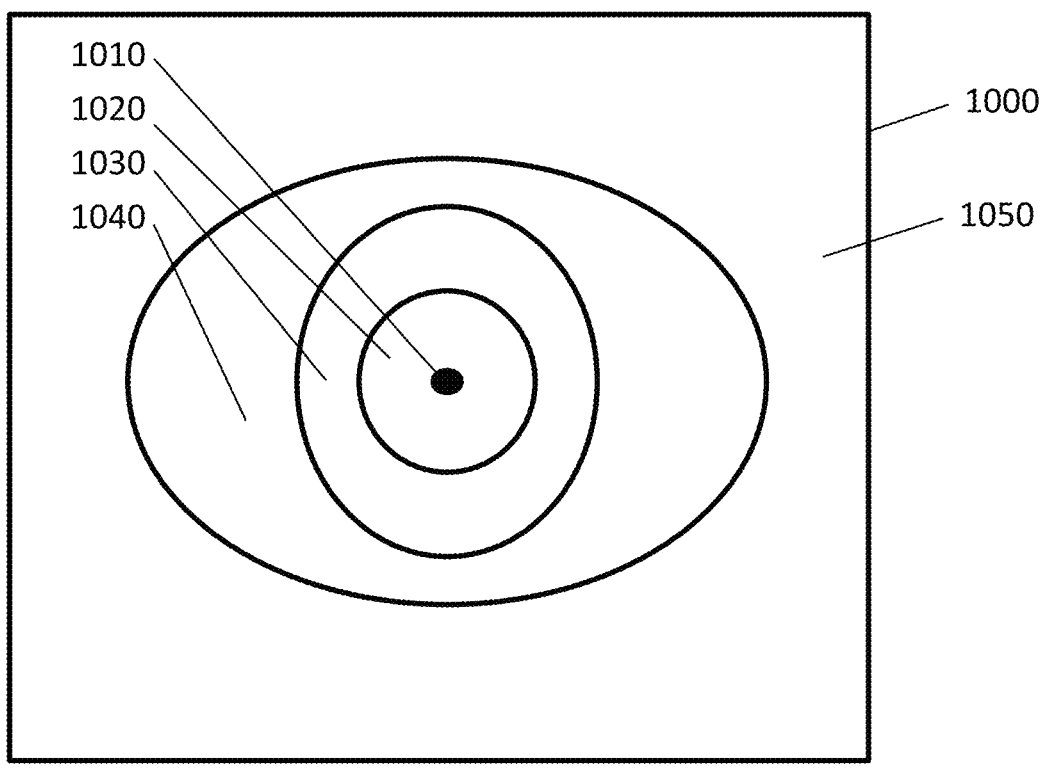
FIG. 10 shows an example of different levels of surface importance.

Simplification is also not a dichotomy. Two or more levels of importance may be included (e.g. $I_{L2}$, $I_{L3}$). such that different degrees of simplification can occur in different areas that radiate out from the virtual camera. For example, in FIG. 10 within an environment 1000 the camera 1010 has an immediate area of importance 1020 which retains complex features, and reduced simplification may be applied. Further from the camera a region of secondary importance 1030 may be simplified more that area 1020. Similarly area 1040 is simplified more than area 1030, whereas the remainder 1050 of the environment, with the least importance will have the greatest degree of simplification. This example can be repeated for multiple virtual cameras, and areas of different levels of importance and varying degrees of simplification mapped for the entire environment.

Neural Network Based Geometric Simplification

Neural Networks can be employed for geometric simplification. A method of interest is Growing Neural Gas. Growing Neural Gas (GNG) is an Artificial Neural Network (ANN) that learns the topology (shape) of n-dimensional objects. The algorithm does this by starting off with two nodes (vertices) in the n-dimensional space, then moving the nodes and growing the graph by adding edges until the shape is learned by the network. After the algorithm is finished, we have a cloud of nodes comprising the simplified mesh. No face information is retained, so we need to reconstruct the faces using another algorithm. With the neural network based geometric simplification approach, we would have the following system: A 3D environment has sections selected for simplification by an importance-directed approach; algorithms are performed to simplify the selected sections to various simplification levels using artificial neural networks; the radiosity solution is calculated for the simplified environment.

Additionally, it is possible to use these Neural Networks to identify the level of simplification required. As simplification of complexity is scalable the determination of the levels required for appropriate radiosity calculations, and for areas that are not important, may be learned by the computer.

Growing Neural Gas Algorithm

Graph networks consist of:

A set of nodes, each containing a location vector and an error value, as well as a counter for the number of direct neighbours to the node and a list of direct neighbours to the node A set of edges, each containing a node a and a node b, as well as an age value The algorithm for Growing Neural Gas (GNG) is as follows (Fritzke, 1995):

1. Start with two randomly placed nodes a and b in $R^n$ with positions $w_a$ and $W_b$.
2. Randomly select a node η from the full mesh using the uniform distribution.
3. Find the nearest node $s_1$ and the second nearest node $s_2$ to the node η.
4. Increment the age of all edges emanating from node $s_1$.
5. Add the squared distance between node η and node $s_1$ to the error value in node $s_1$.
6. Move node $s_1$ and its direct neighbouring nodes towards node η by fractions $\varepsilon_b$ and $\varepsilon_n$ respectively.
7. If node $s_1$ and node $s_2$ are connected by an edge, set the age of the edge to zero. If there is no edge between node $s_1$ and node $s_2$, create one.
8. Remove any edges with an age older than $\alpha_{max}$. If doing so results in nodes having no neighbours, remove these nodes as well.
9. If the number of randomly selected nodes η so far is an integer multiple of a parameter λ, insert a new node as follows:
   Determine the node q that has the highest error value.
   Find the neighbour of q that has the highest error value out of all the neighbours of q, and call it f
   Insert a new node r halfway between q and f
   Create edges between the new node r with nodes q and f then remove the original edge between q and f
   Decrease the error values of q and f by multiplying them with a constant α.
   Set the error value of r with the new error value of q.
10. Decrease the error values for all the nodes in the network by multiplying with a constant d.
11. If a stopping criterion has not been met (e.g. a number of nodes or an error metric), go to step 2.

Optimizations to the Growing Neural Gas Algorithm

The growing neural gas algorithm is computationally expensive in its basic form. We can optimize the algorithm by introducing new data structures and methods of error calculation.

Uniform Grid: The Uniform grid is a data structure that partitions a space into cells so that we may organize a cloud of nodes. The update operation is constant time, and the search query is near constant time (linear time in worst case). A node is placed in the uniform grid by its coordinates which are used as indices. A mathematical formula is used to convert a set of decimal coordinates to a set of integer indices. These indices correspond to the cells of the uniform grid. The uniform grid also has the ability to grow itself when the node density reaches a certain threshold. Growing the uniform grid means splitting the space into more cells, which are smaller in size than before. The nodes are then reinserted into the new uniform grid. When nodes move during the GNG algorithm, we can check if they have changed their place in the uniform grid and then update accordingly (Fiser, 2013).

Morton Space Filling Curve: The Morton space filling curve is a data structure that maps multidimensional data to one dimension and keeps the locality of the data. The Morton code of a node is obtained by interleaving the bits of its x, y, and z coordinates. Nodes in the graph can then be sorted by their Morton codes, which provides the ability to place the nodes into data structures such as balanced trees and priority queues. Using a Morton space filling curve allows for an efficient nearest neighbour search, which is used in the GNG algorithm. The time complexity for using a Morton curve is logarithmic, in both the update operation and the search operation (Connor, 2007). A Morton curve can fill the same role as the Uniform Grid.

Lazy Heap: Finding the node with the largest error is a computationally expensive operation. A lazy heap is a data structure that allows for finding the node with the largest error in an efficient manner. The lazy heap has four operations: insert, remove, update, and top. Update updates a node's position in the heap when the error is changed. Top returns the node with the largest error (the node on top of the heap). The lazy heap maintains a list L of nodes that are waiting to be inserted into the heap. The insert function does not insert a node into the heap but instead inserts a node into the list L. The update function removes a node from the heap and inserts the node into the list L. The top function takes all the nodes in L and inserts them into the heap. Then, the node from the top of the heap is taken and its cycle counter is checked to see if it equals the current value of the global cycle counter c. If it is, the node has the largest error. Else, the fix error function is called for that node, the node is updated, and the top operation is called again. In this manner, the lazy heap is called lazy because it delays all work until the top operation.

We must also define new functions for the optimized growing neural gas algorithm. First, we define new constants:

λ is a constant that determines when to grow the graph in the GNG algorithm
s is the step counter
d is a constant that decreases the error variables
c is the global cycle counter
α is a multiplier that decreases the error variables Then define the new functions:
Increment Error Function:
Fix the error of the node using the Fix Error function
Define a new error $d^{\lambda-s}*error_{node}$+increment value
Use the Set Error function to set the error of the node to the new error value
Update the node in the lazy heap
Decrement Error Function:
Fix the error of the node using the Fix Error function
Use the Set Error function to set the error of the node to $error_{node}*\alpha$
Update the node in the lazy heap
Set Error Function:
Set the error of the node to a value
Set the cycle of the node to a value
Insert the node into the lazy heap
Fix Error Function:
Set the error of the node to $error_{node}*(d^{\lambda(c-cycle_{node})})$
Set the cycle of the node to a value Now the updated growing neural gas algorithm is as follows (with additions in bold):

(a) Start with two randomly placed nodes a and b in $R^n$ with positions $w_a$ and $W_b$.
(b) Initialize cycle counter to 0.
(c) Initialize step counter to 0.
(d) While a stopping condition has not been met, do the following:
(e) Randomly select a node η from the full mesh using the uniform distribution.
(f) Find the nearest node $s_1$ and the second nearest node $s_2$ to the node η by searching the uniform grid.
(g) Increment the age of all edges emanating from node $s_1$.
(h) Add the squared distance between node η and node $s_1$ to the error value in node $s_1$ using the updated increment error function.
(i) Move node $s_1$ and its direct neighbouring nodes towards node η by fractions $\varepsilon_b$ and $\varepsilon_n$ respectively.
(j) Update $s_1$ and its direct neighbouring nodes in the uniform grid.
(k) If node $s_1$ and node $s_2$ are connected by an edge, set the age of the edge to zero. If there is no edge between node $s_1$ and node $s_2$, create one.
(l) Remove any edges with an age older than $\alpha_{max}$. If doing so results in nodes having no neighbours, remove these nodes as well. Remove those nodes from the uniform grid as well as the graph.
(m) Increment the step counter.
(n) If the number of randomly selected nodes η so far is an integer multiple of a parameter λ, insert a new node as follows:
Reset the step counter.
Determine the node q that has the highest error value by checking the top of the lazy heap.
Find the neighbour of q that has the highest error value out of all the neighbours of q, and call it f
Insert a new node r halfway between q and f into the graph and the uniform grid.
Create edges between the new node r with nodes q and f then remove the original edge between q and f
Decrease the error values of q and f by using the updated decrement error function.
Set the error value of r with the new error value of q by using the updated set error function.
Increment the cycle counter.
(o) If the uniform grid has exceeded a density threshold, grow it.
(p) Insert all the nodes in the graph into the newly divided uniform grid.
(q) If a stopping criterion has not been met (e.g. a number of nodes or an error metric), go to step (d).

In a preferred embodiment, Step (f) is parallelized by:
1. Subdividing the set of nodes comprising the full mesh into two or more subsets according to division of their uniform grid or Morton encoding;
2. Finding in parallel the nearest node $s_1$ and the second nearest node $s_2$ within the subset to the node $\eta$ by searching the uniform grid;
3. Gathering the nearest and second nearest nodes of each subset into a set; and
4. Searching the set for the nearest node $s_1$ and second nearest node $s_2$ to the node $\eta$ by means of a linear search.

In another embodiment, Step (n) is parallelized by:
1. Subdividing the set of nodes comprising the full mesh into two or more subsets according to division of their uniform grid or Morton encoding;
2. Finding in parallel the neighbour of q within the subset that has the highest error value out of all the neighbours of q;
3. Gathering the neighbour with the highest error to q within each subset into a set; and
4. Searching the set for the neighbour f with the highest error to q by means of a linear search.

Reconstructing Faces Algorithm

In one example, we have the following:
A set of nodes for the full mesh.
A set of nodes for the simplified mesh.
A set of faces for the full mesh.
The algorithm for reconstructing faces is as follows (Alvarez, 2007):
1. For every node in the full mesh, assign the closest node in the simplified mesh to that node in the full mesh. This will result in one and only one representative node from the simplified mesh for each node in the full mesh.
2. For every face in the full mesh:
    a. Get the representative nodes for each node in the face.
    b. Determine whether all the representative nodes are different from each other.
    c. Add the unique connections to a list.
3. For every unique connection found in step 2, create faces using nodes from the simplified mesh.

Optimizations to Reconstructing Faces Algorithm

An optimization to the Reconstructing faces algorithm is in step 1. The k-means clustering algorithm can be used to separate the nodes in the simplified mesh into clusters, which narrows the search space for finding the representative nodes.

Improvements to Geometric Simplification

Preserving essential details is an important part of geometric simplification. Geometric Deep Learning is a field of interest for this task.

Geometric Deep Learning is the process of designing deep nets on non-Euclidean domains. In other words, deep learning is the process of extracting features from an input. So, a deep learning algorithm could take a 3D object, learn the features, then output a simplified mesh. 3D convolutional neural networks can be used for deep learning. A 3D convolutional neural network could take a full 3D object as an input, spatially compress the 3D object (i.e. into a 2D parametric domain), extract essential edges and nodes from the 3D object, then convert back to a simplified 3D object.

Extracting essential features using geometric deep learning can be done by Mesh Segmentation. This is the decomposition of a 3D mesh into meaningful parts (David George, 2018). An algorithm could be: Take a full 3D mesh, use neural networks to decompose the 3D mesh into meaningful parts, perform geometric simplification, then merge the simplified sub-meshes into an integrated, simplified, mesh. Using an importance directed approach, areas of the mesh with higher importance would be segmented further to preserve details in a higher quality (CN101853525B).

The method above may be implemented using a single or distributed computer system, utilizing one or more central processing unit (CPU) cores and one or more graphics processor unit (GPU) cores, each type of unit completing specific calculation tasks.

The radiosity calculations described above are performed by the CPU, because the GPU architecture does not support histogram generation. However, these same radiosity calculations may be parallelized across multiple CPU cores in one or more CPUs and through distributed computing on a parallel processor system. The geometric simplification calculations, while dependent on the chosen algorithm and not directly dependent on importance, can (and should) be performed by one or more GPU cores in one or more GPUs for maximum parallelization.

The embodiments of the invention may be varied in many ways. Such variations are not to be regarded as a departure from the spirit and scope of the invention, and all such modifications as would be obvious to one skilled in the art are intended to be included within the scope of the claims. While the examples and embodiments provided are primarily given to lighting design and analysis, similar applications which include radiosity and ray tracing methods will apply.

Claim Support

Disclosed is a method for importance directed geometric simplification of a mesh comprising the steps of: calculating an importance for each of multiple elements of the mesh; determining that a first group of the elements each have an importance greater than an importance limit; and generating a simplification of the mesh at a location of a second group of elements of the mesh that are not in the first group.

In some embodiments the method includes, prior to the generating step, determining that a convergence of a radiosity calculation for the mesh is above an importance threshold.

In some embodiments, the calculating step is an initial part of a radiosity calculation, the method further comprising completing the radiosity calculation after generating a simplification of the mesh.

In some embodiments, the generating step comprises: prior to calculating the importance, calculating a simplification of all of the mesh; and after the determining step, rebuilding complexity in the mesh at a location of the first group of elements.

In some embodiments, the calculating step is an initial part of a radiosity calculation, the method further comprising completing the radiosity calculation after the rebuilding of complexity in the mesh.

In some embodiments, the importance of each element is calculated using a calculation of optical radiation incident upon a user specified virtual camera coincident with one or more luminaires in a computer model of the mesh.

In some embodiments, the optical radiation is luminous flux, radiant flux, photosynthetic photon flux density, or a spectral power distribution of the luminaire.

In some embodiments, the generating step uses a scaling factor for the simplification of the mesh.

In some embodiments the method includes classifying the elements of the mesh into three or more levels of importance, wherein the mesh has different scales of simplification applied to it according to the classification of the elements.

In some embodiments the method includes using a neural network to direct the calculation of the importance. In some embodiments the method includes using a neural network to identify a level of simplification of the mesh.

In some embodiments, the elements are surfaces of the mesh.

Further disclosed is a system for importance directed geometric simplification of a mesh comprising: one or more CPU (central processor unit) cores configured to: perform a radiosity calculation for a mesh, the radiosity calculation including a calculation of an importance for each of multiple elements of the mesh; and determine that a first group of the elements each have an importance greater than an importance limit; and one or more GPU (graphics processor unit) cores configured to: generate a simplification of the mesh at a location of a second group of elements of the mesh that are not in the first group.

In some embodiments, the one or more GPUs are configured to generate the simplification by interpolating a vertex importance value for a vertex in the mesh as an average of the importance calculated for elements that share the vertex.

The invention claimed is:

1. A method for importance-directed geometric simplification of a mesh comprising the steps of:
   performing a radiosity calculation for a mesh using one or more CPU (central processor unit) cores, the radiosity calculation including calculating an importance for each of multiple elements of the mesh, wherein the importance is an adjoint to exitance;
   determining, using the one or more CPU cores, that a first group of the elements each have an importance greater than an importance limit; and
   generating, using one or more graphics processor units, a simplification of the mesh at a location of a second group of elements of the mesh that are not in the first group.

2. The method of claim 1 comprising, prior to the generating step, determining that a convergence of the radiosity calculation is above an importance threshold.

3. The method of claim 1 wherein the calculating step is an initial part of the radiosity calculation, the method further comprising completing the radiosity calculation after generating the simplification of the mesh.

4. The method of claim 1 wherein the generating step comprises:
   prior to calculating the importance, calculating a simplification of all of the mesh; and
   after the determining step, rebuilding complexity in the mesh at a location of the first group of elements.

5. The method of claim 4 wherein the calculating step is an initial part of the radiosity calculation, the method further comprising completing the radiosity calculation after the rebuilding of complexity in the mesh.

6. The method of claim 1 wherein the importance of each element is calculated using a calculation of optical radiation incident upon a user specified virtual camera coincident with one or more luminaires in a computer model of the mesh.

7. The method of claim 6 wherein the optical radiation is luminous flux.

8. The method of claim 6 wherein the optical radiation is radiant flux.

9. The method of claim 6 wherein the optical radiation is photosynthetic photon flux density.

10. The method of claim 6 wherein the optical radiation is a spectral power distribution of the luminaire.

11. The method of claim 1, wherein the generating step uses a scaling factor for the simplification of the mesh.

12. The method of claim 11, comprising classifying the elements of the mesh into three or more levels of importance, wherein the mesh has different scales of simplification applied to it according to the classification of the elements.

13. The method of claim 1, comprising using a neural network to direct the calculation of the importance.

14. The method of claim 1, comprising using a neural network to identify a level of simplification of the mesh.

15. The method of claim 1, wherein the elements are surfaces of the mesh.

16. A system for importance-directed geometric simplification of a mesh comprising:
   one or more CPU (central processor unit) cores configured to:
      perform a radiosity calculation for a mesh, the radiosity calculation including a calculation of an importance for each of multiple elements of the mesh, wherein the importance is an adjoint to exitance; and
      determine that a first group of the elements each have an importance greater than an importance limit; and
   one or more GPU (graphics processor unit) cores configured to:
      generate a simplification of the mesh at a location of a second group of elements of the mesh that are not in the first group.

17. The system of claim 16, wherein the one or more GPUs are configured to generate the simplification by interpolating a vertex importance value for a vertex in the mesh as an average of the importance calculated for elements that share the vertex.

* * * * *